United States Patent [19]

Williamson

[11] Patent Number: 4,606,385

[45] Date of Patent: Aug. 19, 1986

[54] TREE LIMB REMOVING APPARATUS

[76] Inventor: Gunnar Williamson, P.O. Box 268, Two Harbors, Minn. 55616

[21] Appl. No.: 675,691

[22] Filed: Nov. 28, 1984

[51] Int. Cl.$^4$ ............................................. B27L 1/00
[52] U.S. Cl. .................................... 144/2 Z; 144/343
[58] Field of Search ................................ 144/2 Z, 343

[56]  References Cited

U.S. PATENT DOCUMENTS

| | | | |
|---|---|---|---|
| 3,398,774 | 8/1968 | Hahn | 144/343 |
| 3,556,180 | 1/1971 | Jones | 144/2 Z |
| 3,659,636 | 5/1972 | Erikksson et al. | 144/2 Z |
| 3,889,729 | 6/1975 | Pinomaki | 144/3 D |
| 3,952,783 | 4/1976 | Windsor | 144/3 D |
| 3,974,866 | 8/1976 | Saarenketo | 144/3 D |
| 4,050,486 | 9/1977 | Whitcomb | 144/2 Z |
| 4,130,151 | 12/1978 | Ericsson | 144/2 Z |
| 4,167,960 | 9/1979 | Wildey | 144/2 Z |
| 4,226,270 | 10/1980 | Sturtz, Jr. et al. | 144/2 Z |
| 4,355,672 | 10/1982 | Hiller von Gaertringen | 144/2 Z |

FOREIGN PATENT DOCUMENTS

| | | | |
|---|---|---|---|
| 1053542 | 5/1979 | Canada | 144/2 Z |
| 619339 | 8/1978 | U.S.S.R. | 144/2 Z |
| 634937 | 11/1978 | U.S.S.R. | 144/2 Z |
| 649580 | 4/1979 | U.S.S.R. | 144/2 Z |
| 870144 | 10/1981 | U.S.S.R. | 144/2 Z |

*Primary Examiner*—Francis S. Husar
*Assistant Examiner*—Jorji M. Griffin
*Attorney, Agent, or Firm*—Dorsey & Whitney

[57]  ABSTRACT

A tree harvesting device for removing the limbs of a felled tree is provided that includes a unique delimbing blade assembly for cutting tree limbs flush with the trunk of a felled tree. The delimbing blade assembly includes a plurality of concave delimbing blades positioned about and defining a center axis. The blades are pivotally mounted on blade support arms. The support arms are shiftable through arcuate paths of travel for urging their respective blades into self-centered, cutting engagement with the trunk of a tree to be delimbed.

5 Claims, 6 Drawing Figures 4,606,385

TREE LIMB REMOVING APPARATUS

TECHNICAL FIELD

This invention relates generally to tree harvesting machinery, and more particularly to an apparatus for trimming, delimbing, and cutting tree-length logs into bolts of suitable lengths.

BACKGROUND ART

Felled trees must be delimbed and cut to uniform, suitable lengths for ease of processing the trees into cut lumber or pulp. The requirement for delimbing trees is particularly burdensome when dealing with trees similar to spruce, balsam, jack and Norway pine that have a multitude of limbs, making it difficult and time-consuming to remove the limbs by hand.

Tree harvesting machinery has in the past been designed that automatically delimbs felled timber, and cuts the timber into suitable lengths. Examples of such harvesters include those disclosed in U.S. Pat. Nos. 4,226,270, 4,167,960, 3,974,866, 3,952,783, 3,889,729, 3,556,180, and 3,398,774. There remains a need, however, for a tree harvester that, with a simple and efficient design, can accommodate felled trees varying in diameter from as great as 16 inches at their base to 3 inches at their top. In particular, the delimbing knives of a delimber should be self-adjusting so that the limbs of a tree are removed flush with the trunk of the tree, regardless of the tree's diameter.

SUMMARY OF THE INVENTION

The tree limb removing apparatus in accordance with the present invention incorporates a simple, and unique design that successfully removes each of the limbs of a tree flush with the tree's trunk, regardless of the diameter of the tree. Moreover, the blade assembly effectively circumscribes the trunk of a tree at all of the trunk's various diameters, leaving no gaps, at any point along the trunk's tapered diameter, through which branches can slide through uncut. The limb removing apparatus hereof includes a plurality of arcuate cutting blades pivotally mounted on cutting blade arms that are in turn pivotally mounted. The arms urge the blades into cutting contact with the trunk of a tree, and the pivotal mounting of the blade on the arms provides for self-centering of the blades relative to the axis of the tree trunk.

BRIEF DESCRIPTION OF THE DRAWINGS

FIG. 3a is a fragmentary, exploded view of the shiftable log stop;

DETAILED DESCRIPTION OF THE DRAWINGS

Figure 1:
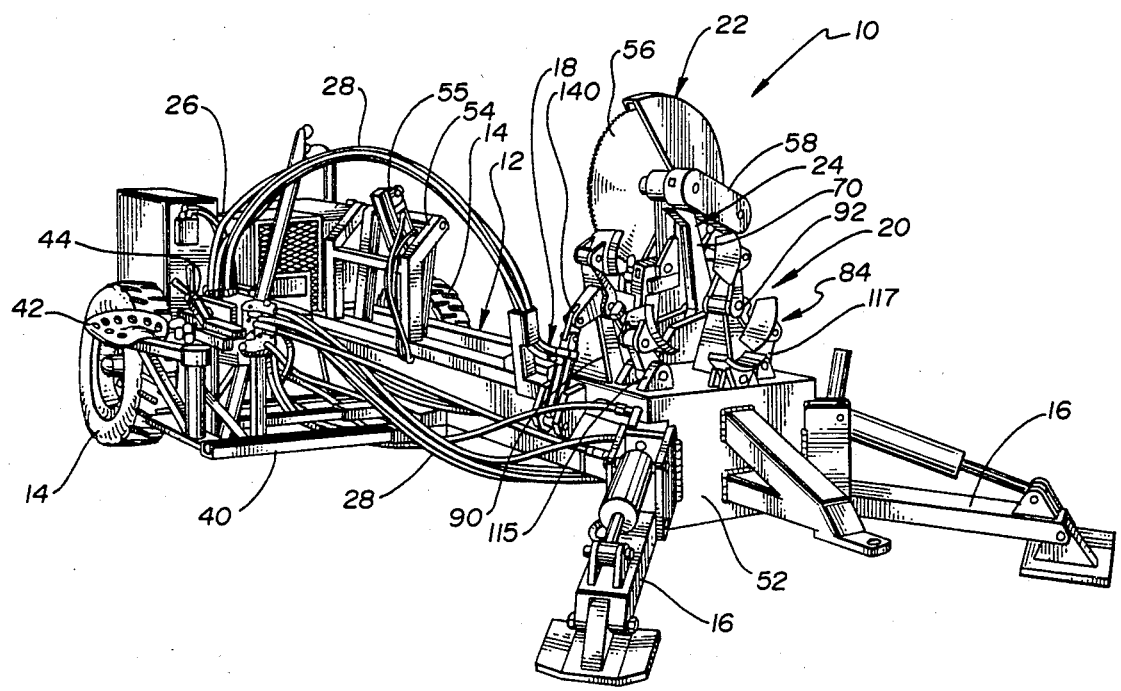
FIG. 1 is a perspective view of a tree limb removing apparatus in accordance with the present invention configured to receive a tree for delimbing.

Referring to the drawings, a tree limb removing apparatus 10 in accordance with the present invention broadly includes a frame 12 supported by ground engaging wheels 14 and retractable foot pads 16, carriage 18 slidably mounted on the frame 12, delimbing blade assembly 20, rotating blade assembly 22, log ejector 24, hydraulic motive means 26, and a plurality of hydraulic lines 28 interconnecting the motive means 26, delimbing blade assembly 20, rotating blade assembly 22, and log ejector 24.

The frame 12 includes base member 32, and opposed track assemblies 32, 34. Opposed log catching assemblies 36, 38 extend outwardly from either side of the frame 12. The frame undercarriage 40 supports operator seat 42, and manually operated hydraulic controls 44.

Sliding carriage 18 includes inverted U-shaped platform 46 shiftably mounted on frame tracks 32, 34 by guide wheels 48, 50. The carriage 46 is shiftable in a reciprocating path of travel along frame tracks 32, 34 by a hydraulically actuated piston and cylinder assembly (not shown). The sliding carriage 18 is stopped at the forward end of its path of travel by frame front structure 52. Brace 54 includes an optional hydraulically actuated log kicker 55 for ejecting logs from the carriage 18.

Figure 3:
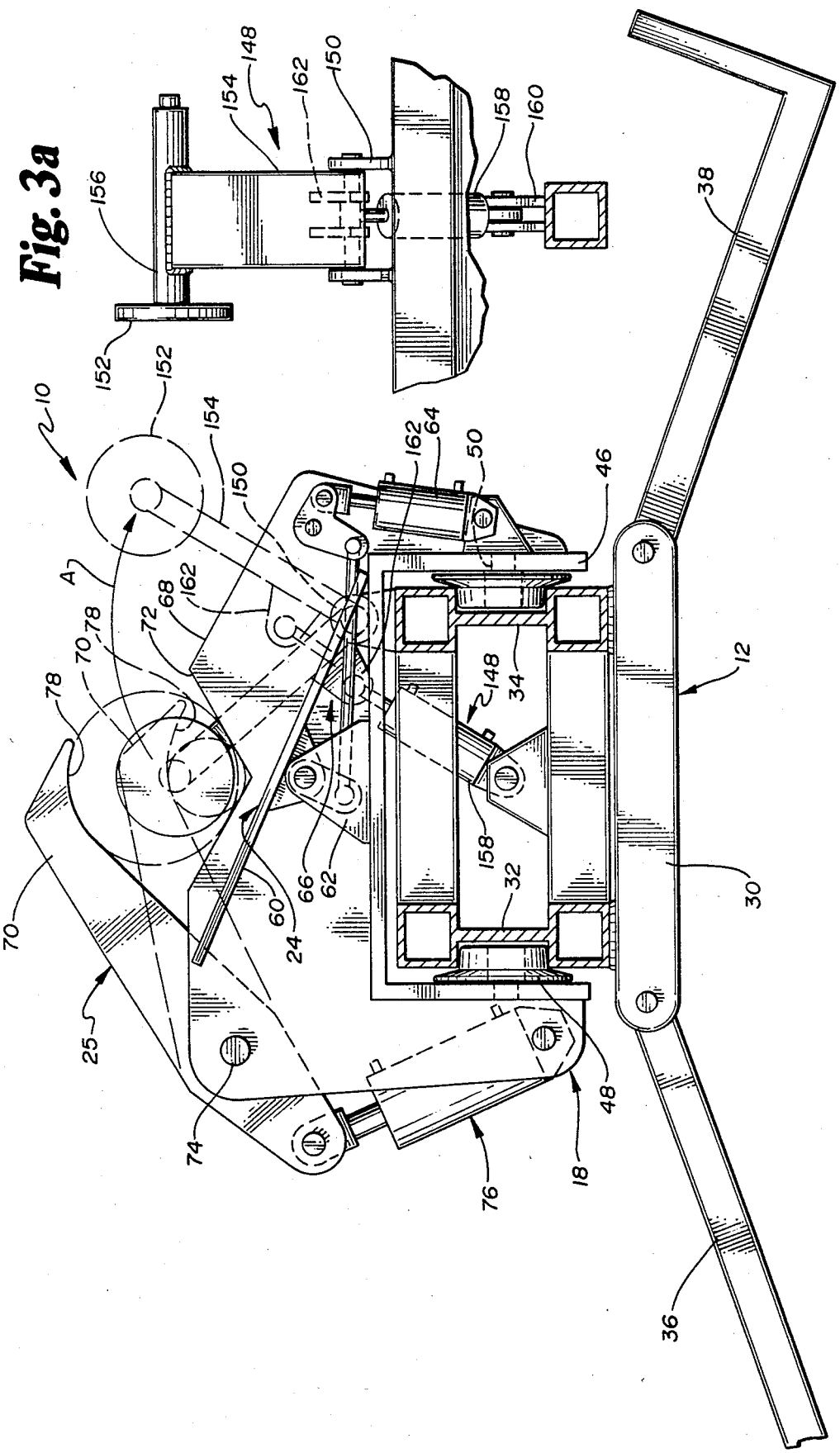
FIG. 3 is a sectional view taken along line 3—3 of FIG. 1, and depicting the clamp and an optional discharge table.
Figure 4:
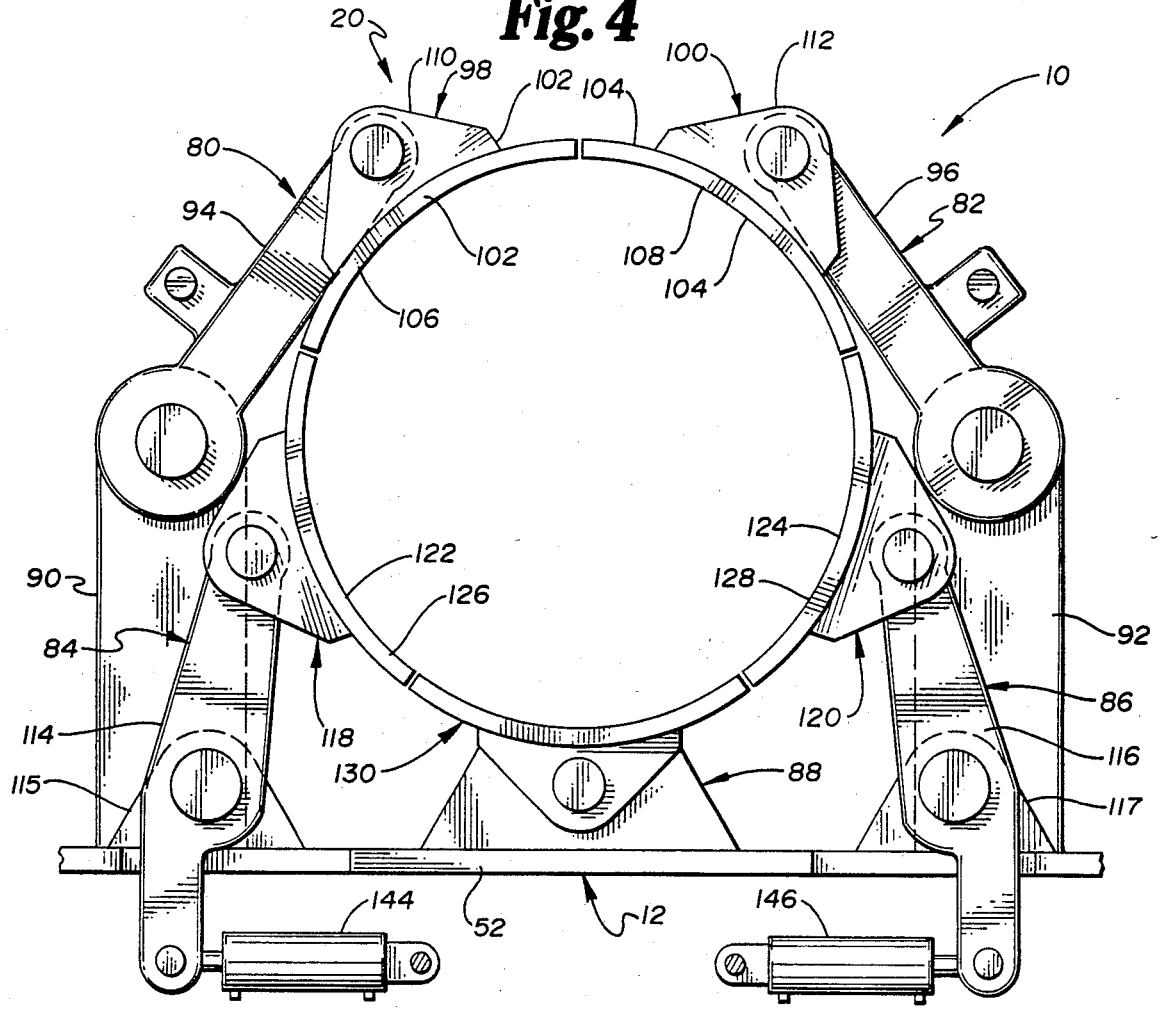
FIG. 4 is a front elevational view of the blades showing the maximum log diameter configuration.
Figure 5:
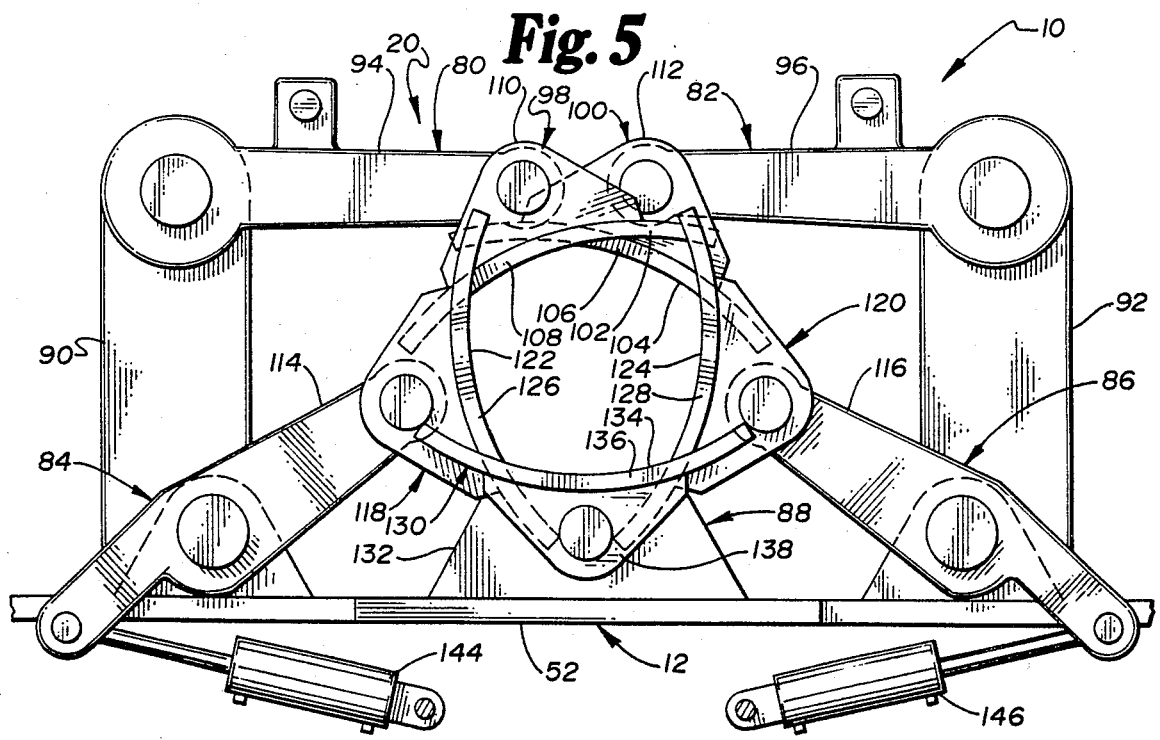
FIG. 5 is similar to that of FIG. 4, but showing the minimum log diameter configuration.

The rotating blade assembly 22 includes circular saw blade 56 mounted on shiftable support arm 58. The support arm 58 is pivotally mounted to frame 12. Referring to FIG. 3, log ejector 24 includes adjustable roll plate 60 mounted to sliding carriage 18 by bracket 62. The roll plate 60 is connected to hydraulically actuated piston and cylinder assembly 64 by a lever mechanism 66.

Clamp assembly 25 includes tree trunk supporting plate 68 fixedly attached to the U-shaped carriage platform 46, and pivotal clamp arm 70. Plate 68 includes V-shaped notch 72. Clamp arm 70 is attached to the support plate 68 by pivot pin 74 and hydraulically acuated piston and cylinder assembly 76. Clamp arm 70 includes an arcuate, tree grasping inner face 78.

Delimbing blade assembly 20 is mounted to the front structure 52 of frame 12. The delimbing blade assembly 20 includes upper cutting mechanisms 80, 82, intermediate cutting mechanisms 84, 86, and lowermost cutting mechanism 88. Upper cutting mechanisms 80, 82 are pivotally mounted on respective, opposed, upright stanchions 90, 92 projecting upwardly from frame front structure 52. The upper cutting mechanisms 80, 82 include support arms 94, 96 pivotally carried by stanchions 90, 92, and blade assemblies 98, 100. Blade assemblies 98, 100 include concave cutting blades 102, 104 having beveled cutting edges 106, 108, and blade support brackets 110, 112 pivotally coupling their respective blades 102, 104 to support arms 94, 96.

Intermediate cutting mechanisms 84, 86 include blade support arms 114, 116 pivotally coupled to support pads 115, 117, and blade assemblies 118, 120. Blade assemblies 118, 120 include concave cutting blades 122, 124 having beveled cutting edges 126, 128, and blade support brackets 130, 132 pivotally coupling blades 122, 124 to the blade support arms 114, 116.

Lowermost cutting mechanism 88 includes blade assembly 130 and blade support pad 132. The blade assembly 130 includes concave cutting blade 134 having beveled edge 136, and blade support bracket 138 pivotally coupling blade 134 to support pad 132. Support pad 132 is fixedly positioned on the frame front structure 52.

As best depicted in FIG. 1, each of the cutting mechanisms are longitudinally offset from each other such that each cutting mechanism can travel through its arcuate path of travel without interference from any of the other cutting mechanisms. In particular, lowermost cutting mechanism 88 is located forwardmost, followed in successive order by intermediate cutting mechanism 84, intermediate cutting mechanism 86, upper cutting mechanism 80, and finally upper cutting mechanism 82.

Upper cutting mechanisms 80, 82 are shifted in an arcuate path of travel by hydraulically actuated piston and cylinder assemblies 140, 142, respectively. Intermediate cutting mechanisms 84, 86 are shifted through arcuate paths of travel by hydraulically actuated piston and cylinder assemblies 144, 146.

Pivotal log stop 148 is mounted to frame 12 by support 150. The log stop 148 includes circular stop plate 152 fixedly connected to arm 154 by support rod 156. Hydraulic piston and cylinder assembly 158 is connected to frame 12 by bracket 160 at one end thereof, and is connected at its opposite end to arm 154 by bracket 162.

In operation, the delimbing apparatus 10 is made ready for delimbing a felled tree by shifting carriage 18 all the way forward to abut against frame front structure 52, and fully opening the delimbing blade assembly 20, all as depicted in FIG. 1. Moreover, and again referring to FIG. 1, the rotating blade assembly 22 is retracted to a tree limb clearing position, as is the clamp arm 70 of clamp assembly arm 25.

Figure 2:
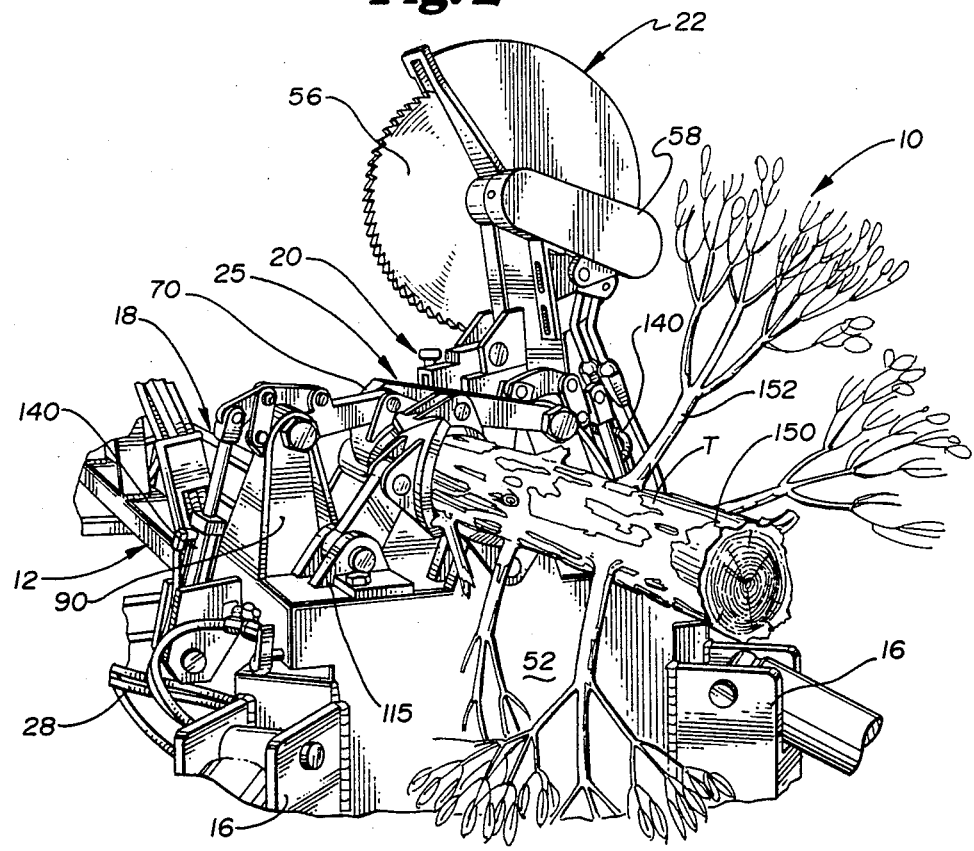
FIG. 2 is a fragmentary perspective view of the invention with the clamp and knives in closed, cutting position about a tree to be delimbed.

After the delimbing apparatus 10 is in the configuration of FIG. 1, a felled tree T having trunk 150 and limbs 152 is placed in position within the delimbing blade assembly 20. Clamp arm 70 is then shifted by piston and cylinder assembly 76 into tight clamping engagement with the trunk of tree T. It is to be understood that at this point the trunk of tree T rests upon the lowermost cutting mechanism 88 and within the notch 72 of plate 68. The upper and intermediate cutting mechanisms 80, 82, 84, 86 are next shifted from their tree clearing positions, as shown in FIG. 1, through their respective arcuate paths of travel, into their tree abutting positions, as depicted in FIG. 2, by actuation of their respective piston and cylinder assemblies. The piston and cylinder assemblies 140, 142, 144, 146 maintain a constant pressure on their respective upper and intermediate cutting mechanisms such that the arcuate cutting blades 102, 104, 122, 124 are continually urged against the trunk of tree T. The cutting mechanisms are therefore maintained in abutting contact with the tree trunk, even as the diameter of the trunk presented to the blade assembly 20 varies. As will be appreciated, the pressure exerted by the upper and intermediate cutting mechanisms urge the trunk of tree T into abutting engagement with lowermost cutting mechanism 88.

Once the clamp arm 70, and cutting mechanisms 80, 82, 84, 86, 88 are in tight engagement with the trunk of tree T, the sliding carriage 18 is shifted rearwardly along tracks 32, 34. As the trunk of tree T is shifted rearwardly by the sliding motion of the carriage 18, the limbs protruding from the trunk of tree T are sheared off by the delimbing blades' beveled edges 106, 108, 126, 128, 136. The base of the tree will abut against log stop T as the trunk is shifted rearwardly, stopping the rearward travel of carriage 18.

After the sliding carriage 18 has ceased its rearward motion, clamp arm 70 is disengaged from the trunk. Sliding carriage 18 is then shifted forwardly to its initial position, while the tree T remains stationary. The circular sawblade 56 of blade assembly 22 is next brought into cutting engagement with the trunk of tree T, thereby severing the stripped portion of the trunk from the remainder of the tree T and causing the severed trunk portion to fall onto tiltable roll plate 60. The orientation of tiltable roll plate 60 is controlled by piston and cylinder assembly 64 and lever mechanism 66. As depicted in FIG. 3, the roll plate can be tilted either to the right or to the left, thereby depositing the severed trunk portions into log catching assembly 36 or 38, respectively. Referring to FIG. 3, log stop 148 may be shifted upwardly in the direction indicated by arrow A, to clear the severed log and facilitate the ejection of the log from the carriage 18.

The pivotal connection of the blade assemblies 98, 100, 118, 120, 130 to their respective support arms, and the arcuate path of travel of the upper blade support arms 94, 96 and intermediate blade support arms 122, 124 inherently self-centers the delimbing blade assembly cutting blades relative to the trunk of a tree T to be delimbed. In particular, the blade assemblies will pivot about their respective support arms and pad as the delimbing blade support arms are shifted towards the tree trunk and the arcuate blades are brought into contact with the tree trunk, causing the points of contact of each blade with the tree trunk to be at the blade's center.

I claim:

1. An apparatus for removing the limbs from the trunk of a felled tree, comprising:
   means for grasping said tree;
   a blade assembly; and
   means operably coupling said grasping means and said blade assembly for shifting said grasping means relative to said blade assembly,
   said blade assembly including
      lowermost, intermediate, and uppermost cutting mechanisms positioned about and defining a center axis, along which said tree is shifted by said grasping means for cutting engagement of said limbs with said blade assembly, said intermediate cutting mechanism comprising a pair of spaced apart, arcuate, cutting blades oriented on opposed sides of said center axis, and said uppermost cutting mechanism comprising a pair of spaced apart, arcuate cutting blades oriented on opposed sides of said center axis;
   means for urging said cutting blades of said uppermost and intermediate cutting mechanisms towards said center axis and into engagement with said tree trunk at respective points of contact; and
   means pivotally coupling said cutting blades to said urging means at respective, centered connection points on said cutting blades, said connection points of said uppermost cutting mechanism blades being oriented above said center axis, and said connection points of said intermediate cutting mechanism blades being oriented below said connection points of said uppermost cutting mechanism blade and above said lowermost cutting mechanism, whereby said blades pivot about said connection points upon contact with said trunk to inherently self-center said blades about their respective points of contact with said trunk.

2. An apparatus as claimed in claim 1, said urging means being shiftable through acruate paths of travel for urging said blades towards said center axis.

3. An apparatus as claimed in claim 1, said cutting blades defining concave cutting edges.

4. An apparatus as claimed in claim 1, said urging means comprising blade support arms operably coupled to hydraulically actuated piston and cylinder assemblies.

5. An apparatus as claimed in claim 1, said blade assembly including a lowermost cutting blade pivotally coupled to a stationary support pad.

* * * * *